Figure 1:
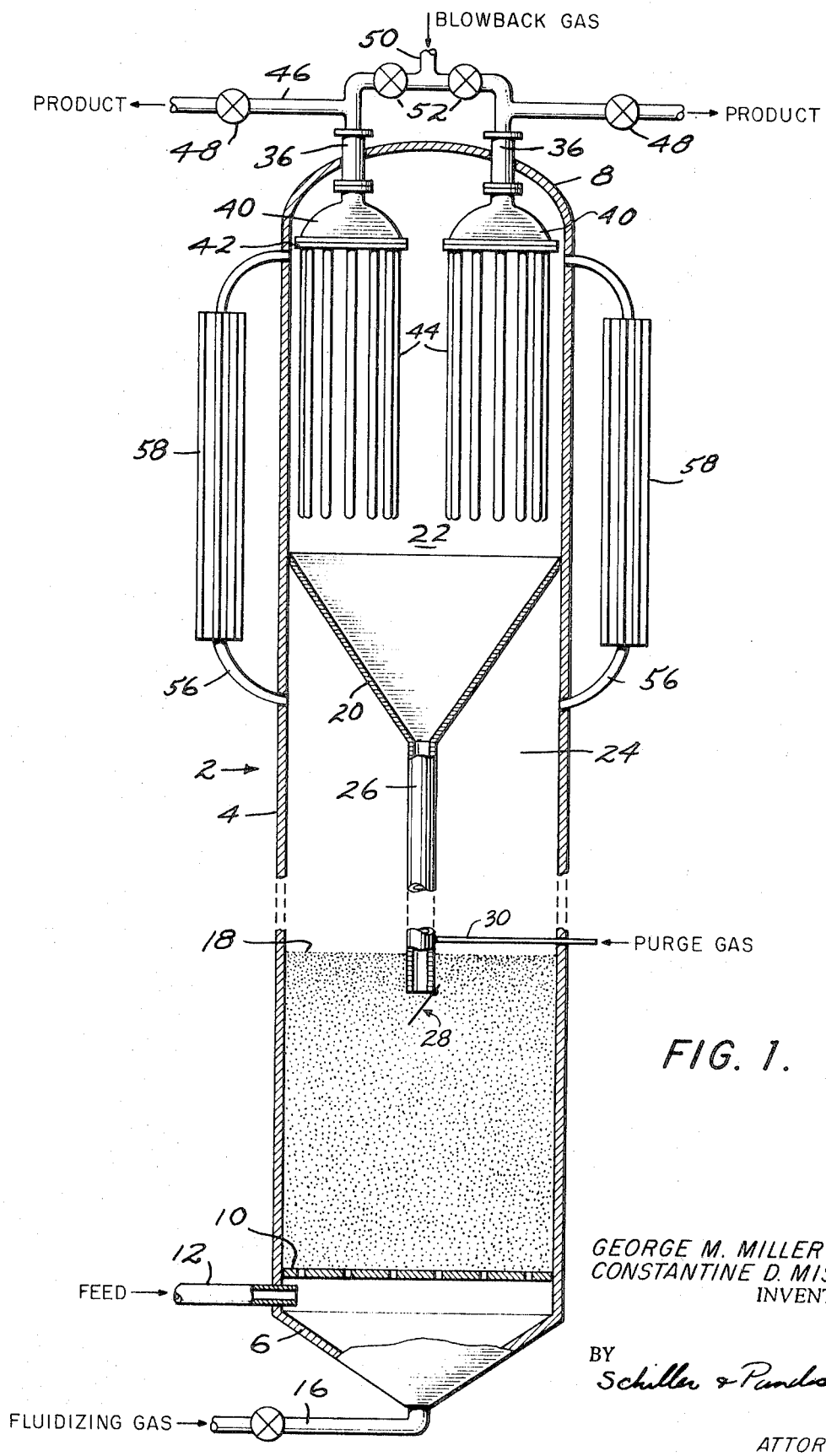

United States Patent

[11] 3,615,256

[72] Inventors George M. Miller
Winchester;
Constantine D. Miserlis, Arlington, both of Mass.
[21] Appl. No. 817,785
[22] Filed Apr. 21, 1969
[45] Patented Oct. 26, 1971
[73] Assignee The Badger Company, Inc.
Cambridge, Mass.

[54] SYSTEM FOR SEPARATING CATALYST FROM A FLUID BED REACTOR
10 Claims, 2 Drawing Figs.

[52] U.S. Cl. .................................................. 23/288 S,
23/284, 23/288 F, 55/268, 55/302, 260/346.4,
23/288 K
[51] Int. Cl. ...................................................... B01j 9/20,
B01d 46/04, B01d 46/24
[50] Field of Search ................................................ 23/284,
288.35; 55/268, 302, 341, 342, 3, 5, 6, 350, 474;
34/57 A; 260/346.4

[56] References Cited
UNITED STATES PATENTS

| 2,453,740 | 11/1948 | Becker | 260/346.4 |
| 2,526,651 | 10/1950 | Garbo | 23/288.3 X |
| 2,595,524 | 5/1952 | Hemminger | 23/288.3 X |
| 2,684,869 | 7/1954 | Lapple | 23/288.3 UX |
| 2,718,754 | 9/1955 | Lewis et al. | 23/288.3 X |
| 3,205,275 | 9/1965 | Johnson | 260/346.4 X |
| 3,226,338 | 12/1965 | Riley et al. | 260/346.4 X |
| 3,333,402 | 8/1967 | Kalen | 55/345 |
| 3,480,408 | 11/1969 | Lacroix | 23/288.35 |

OTHER REFERENCES

Anastasia et al., " Oxidation Fluorination of Uranium Dioxide Pellets in a Fluidized Bed," I & EC. Proc. Design & Dev., 4:338– 44 (1965).

Riley, " Design of Fluidized Reactors for Naphthalene..." Trans. Inst. Chem. Engrs., 37:22– 308– 13 (1959).

Primary Examiner—Morris O. Wolk
Assistant Examiner—D. G. Conlin
Attorney—Schiller & Pandiscio ABSTRACT: System for stripping catalyst dust from the effluent stream of a fluid catalyst bed reactor, including an enclosed separation chamber in the reactor above the fluid bed, a plurality of cooling conduits mounted outside the reactor for carrying the effluent plus entrapped catalyst dust from the reactor to the separation chamber; and, within the chamber, one or more filtering means for stripping catalyst dust from the effluent, the effluent being continuously removed from the separation zone via the filtering means and the separated catalyst dust being returned to the fluid bed.

SYSTEM FOR SEPARATING CATALYST FROM A FLUID BED REACTOR

This invention relates to the separation of powdered or particulate solids from a gas or vapor, and more particularly to an improved system for stripping catalyst dust from the gaseous effluent of a fluid bed reactor.

The present invention is applicable to well-known fluid bed catalytic processes such as processes for conversion of hydrocarbons. By way of example but not limitation, the invention is applicable to processes for conversion of naphthalene to phthalic anhydride. In the typical fluid bed reactor system, the feed material (which may comprise one or more reactants according to the nature of process) is fed into a reactor containing a fluidized catalyst bed. The catalyst and feed material are contacted for a period sufficient to carry out the desired reaction, after which the effluent stream plus a small amount of catalyst which is entrapped or suspended therein flows upwardly into an area above the fluid bed which is commonly called the disengaging zone. While within this zone, a portion of the catalyst dust settles out and is returned to the fluid bed. The balance of the entrapped catalyst fines remains suspended in the effluent.

Since loss of catalyst is expensive, complicates subsequent treatment or use of the effluent, and also produces air pollution, it is necessary to employ filters with porous filtering media or cyclones for separating the dust from the effluent. However, heretofore such means have not been fully satisfactory, particularly when the catalyst is of a highly active variety such as the finely divided vanadia-silica gel catalyst used in phthalic acid anhydride plants. Because of the large active area of the catalyst dust particles entering the filtering medium, it is necessary in many systems to cool the dust-laden effluent gases below a certain threshold temperature in order to prevent serious fires or afterburning in the dilute phase or on the densely packed filter surface. The use of a quench bed or large amounts of quench gas normally required to achieve the necessary cooling is costly. Accordingly the practice has developed of locating the filter vessel apart from the fluid bed reactor vessel and of cooling the dust-laden gas by passing it through bare ducts or pipes connecting the two vessels. A typical system of this type comprises five pipes which lead from the top of the reactor vessel to individual filter units in the filter vessel. The filter system is operated cyclically so that at any given time effluent is flowing through four of the filter units while air is being blown back through the fifth filter unit for the purpose of clearing it of catalyst particles and returning same to the reaction zone. Due to the large area of cooling surface required, it is often necessary to locate the filter vessel a significant distance from and generally below the top of the reactor vessel. The difficulty with this type of filter system is that installation costs are relatively expensive. Expensive sealing means are required to seal the filter tube sheets against loss of catalyst dust. Furthermore large amounts of blowback gas are required to return the filtered dust back to the reactor vessel.

The use of cyclone separators presents similar problems. Furthermore the usual practice is to mount one or more cyclone separators within the reactor and to provide depth pipes to return the separated catalyst dust to the fluid bed. The cyclone must be mounted above the catalyst bed to permit the separated dust to return through the depth pipes easily. It is necessary in many systems employing cyclones to cool the dust-laden gases prior to entering the cyclones in order to prevent serious fires or afterburning using quench beds or large amounts of quench gas. Such means are very costly.

Accordingly, the primary object of the present invention is to overcome the limitations of presently available systems for separating catalyst dust from the effluent stream of a fluid bed reactor.

A specific object is to provide a new and improved filtering system for removing catalyst dust from the effluent vapor stream of a fluid bed reactor, which is characterized by simple design, lower construction cost, minimal danger of fires or explosion, substantially total dust separation and lower operating costs.

These and other objects are achieved by apparatus which essentially comprises a filtering system disposed within a stripping or separation chamber located above the fluid catalyst bed. The filtering system comprises one or more filter or cyclone separators arranged to exhaust the stripped effluent from the separation chamber and a plurality of cooling pipes which lead from the disengaging zone of the reactor to the separation chamber and form a continuous passage therebetween. In operation, the catalyst-laden reactor effluent passes upwardly through the cooling pipes from the reactor where it is cooled by radiation and then into the separation chamber where it passes into the filters or cyclones. The latter strip the dust from the effluent. The effluent is exhausted from the filtering system while the separated dust collecting in the separation chamber is returned to the reactor.

Figure 2:
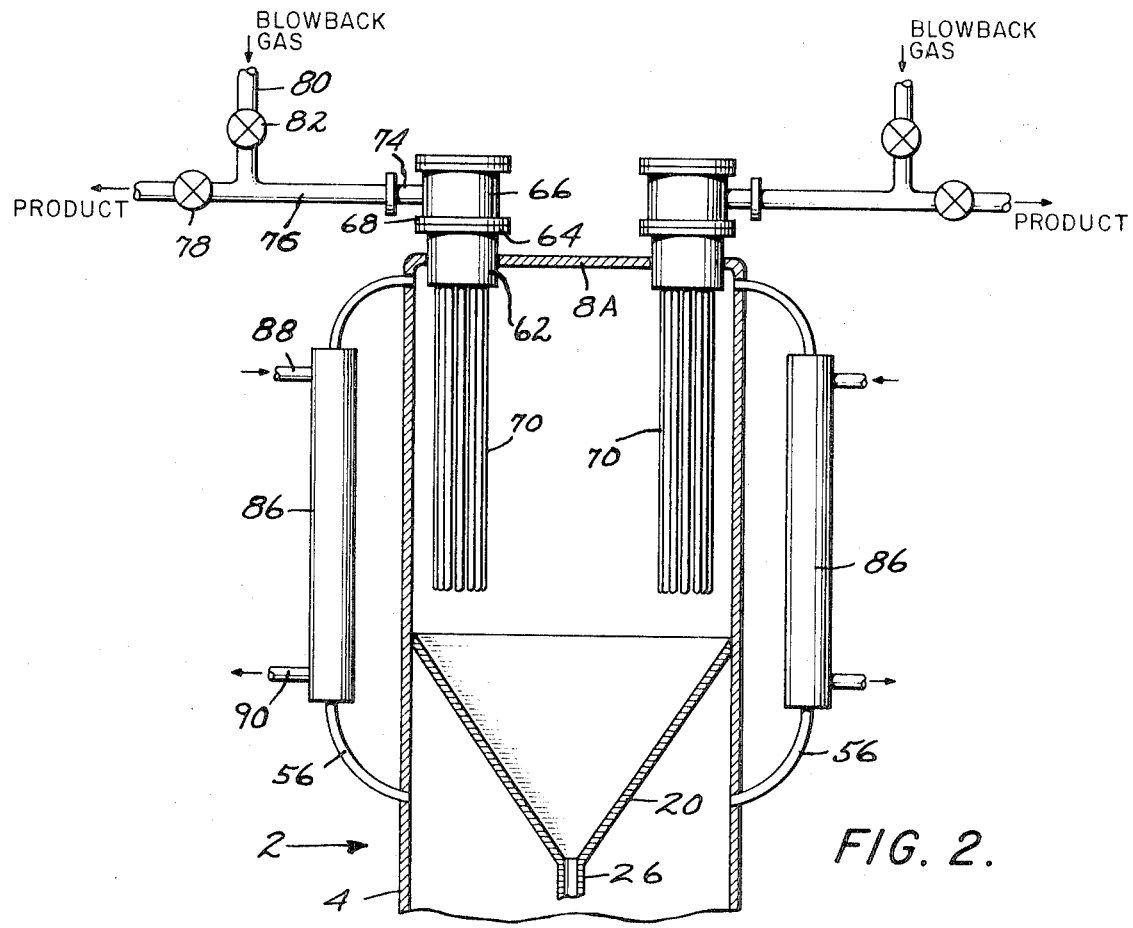

Other objects and features and many of the attendant advantages of the present invention are set forth in or rendered obvious by the following detailed specification which is to be considered together with the accompanying drawings wherein:

FIG. 1 is a side elevation, partly in section, of a reactor vessel exemplifying a preferred embodiment of the invention; and FIG. 2 is a fragmentary side elevation, partly in section, of a reactor exemplifying a second embodiment of the invention.

Referring to FIG. 1, there is shown a fluid bed reactor vessel 2 comprising a cylindrical sidewall 4 which is closed off by a conical bottom end wall 6 and a domed top end wall 8. Mounted within the bottom end of the vessel 2 is a perforated plate 10 which supports a bed of catalyst in particulate form. Depending upon the reaction to be conducted in the reactor, the catalyst bed is maintained in a fluidized state by the passage upward through it of a stream made up of or comprising the reactant or reactants in gaseous or vapor form or a stream of an auxiliary fluidizing gas such as air, nitrogen or an inert gas.

The particular embodiment shown in FIG. 1 is adapted for oxidizing naphthalene to produce phthalic anhydride. Accordingly the bottom end of the reactor is fitted with one or more inlet pipes 12 for naphthalene feed and an additional pipe 16 at the lowest point in bottom end wall 6 through which fluidizing gas in the form of air is introduced. The perforated plate 10 serves to promote even distribution of the feed material and fluidizing gas to the catalyst bed, thereby providing proper fluidization and adequate contact of the catalyst by the feed material. The catalyst bed is fluidized to an appropriate level as indicated at 18.

Also mounted within the vessel 2 an appropriate distance below the domed upper end wall is a continuous wall 20 in the form of an inverted cone. Wall 20 serves to subdivide the interior of the vessel to provide a catalyst separation chamber 22. Wall 20 is located some distance above the level 18 of the fluid bed, thereby providing a disengaging zone 24 for the catalyst. At its lowest point wall 20 is fitted with a catalyst return pipe 26 which preferably, but not necessarily, is long enough to extend below the upper surface 18 of the fluid catalyst bed. Pipe 26 is fitted with a trickle valve 28 which operates on the principle of a nonreturn flapper check system. For adjusting the rate at which catalyst trickles back to the catalyst bed from the separation chamber 22 a purge gas stream (air or some other suitable gas) may be used to position the flapper. In the illustrated embodiment the purge gas stream is introduced to pipe 26 via a line 30. The upper surface of wall 20 and the interior of pipe 26 may be coated with a continuous lining 32 of an abrasive resistant material to prevent wear by the catalyst particles.

Mounted in the domed upper end wall 8 is a plurality of effluent exhaust pipes 36. Attached to the lower end of each pipe 36 is a separate filter assembly. Each filter assembly comprises a domed manifold 40 to which is releasably attached a tube sheet 42 which carries a bundle or plurality of elongate filter elements 44 which are impervious to the catalyst dust.

The filter elements may be in the form of flat rectangular leaves, cylindrical tubes, or some other suitable form well known in the art. By way of example, filter elements 44 may comprise cloth envelopes or bags surrounding and supported by screens or may be made of a porous self-supporting material such as a sintered metal or metal alloy or a ceramic. The cloth envelopes or bags must be made of a material which is not readily abraded or damaged by the catalyst dust and is resistant with respect to the components of the effluent and the operating temperatures. By way of example but not limitation the cloth envelopes or bags may be made of glass cloth. Each of the exhaust pipes 36 is connected to an effluent delivery pipe 46 by way of a first control valve 48 and to a blowback gas pipe 50 by way of a control valve 52. Pipe 50 is connected to a source of high-pressure blowback gas (not shown).

Also provided are means external to the reactor for transferring catalyst-laden effluent from the disengaging zone 24 to the separation chamber and for cooling the effluent as it is being transferred. Such means comprises a plurality of long pipes 56 secured to vessel 2. Although only two such pipes are shown, it is to be understood that in the usual case more than two are employed and that they are spaced more or less uniformly along the circumference of vessel 2. Each pipe 56 connects at its lower end with the disengaging chamber at or adjacent the upper end thereof, and connects at its upper end with the separation zone adjacent the upper ends of the filter elements 44. To improve the rate of cooling, each pipe 56 is provided with a plurality of cooling fins 58. Alternatively, each pipe may be fitted with a jacket through which a cooling fluid may be circulated.

Although not shown, it is to be understood that the vessel 2 may be provided with one or more manways providing access to the separation zone for maintenance, repair or replacement of the filter elements. Additionally means in the form of a pump or like device may be used to provide a positive exhaust of the catalyst-free effluent from the separation zone.

Operation of the reactor just described is straightforward. The valves 48 are open and the valves 52 are closed. The catalyst bed is fluidized and the feed material contacted with the catalyst bed under conditions adequate to support the desired reaction. The reaction effluent carrying suspended catalyst passes into the disengaging zone where the larger catalyst particles separate out and return to the catalyst bed by gravity. The effluent with whatever catalyst dust is still suspended therein (fines and larger particles) leaves the disengaging zone via pipes 56 and moves into the separation chamber 22. As it travels through the pipes 56, the effluent is cooled to a suitable temperature as determined by the heat exchange and dissipating capability of pipes 56 and the cooling means carried by such pipes. The effluent in the separation chamber 22 passes through the several filters and leaves the reactor vessel via pipes 36 and 46, while the catalyst particles are retained in the separation chamber by the filters. The separated catalyst dust drops down onto the wall 20 from which it is returned to the fluidized bed by return pipe 26 at a rate determined by the setting of trickle valve 28. In the course of normal operation catalyst fines tend to accumulate on the filter elements, with the result that the efficiency of the filter elements is lowered. This may be offset by closing-off individual valves 48 without opening valves 52, with the result that the catalyst buildup is cleared by gravity. The several filter assemblies are subjected to this cleaning procedure one at a time so that the reactor can continue to operate. Alternatively and preferably, however, the filter assemblies are cleared by subjecting them to blowback, preferably one at a time. This is achieved by closing a valve 48 and opening the associated valve 52 so that blowback gas flows through the selected filter assembly into the separation zone 22. Blowback gas is allowed to flow for a period (usually in the order of 5 minutes) sufficient to remove the catalyst buildup. Thereafter the open valve 52 is reclosed and closed valve 48 is reopened to restore the filter assembly to an operative state. The procedure is repeated for each filter assembly in turn. Of course, it is contemplated that more than one, but less than all, of the filter assemblies may be cleaned at the same time, but this is not preferred since it tends to reduce the net rate of production of the reaction system. It is to be appreciated also, in conformance with standard practice, that the several valves 48 and 52 may be replaced with an automatic cycling multiport valve adapted to successively subject each filter assembly to blowback while the other filter assemblies are filtering effluent. This type of valve may take various forms, typically including inlet ports for each effluent exhaust pipe 36, an inlet port for blowback gas, an outlet port for filtered effluent, and a rotary valve member adapted to move from one to the other of a number of different positions in each of which one effluent exhaust pipe 36 is connected to the source of blowback gas and the other effluent exhaust pipes 36 are connected to the exhaust port for filtered effluent. Details of such a valve are omitted from the drawing since such valves are well-known.

FIG. 2 illustrates an alternative form of the invention which employs direct pullout type filter units. Only the upper end of the reactor is shown and it is to be understood that the omitted portion is substantially the same as the corresponding portion of the reactor of FIG. 1. In this embodiment the upper end of the vessel 2 terminates in a flat or domed end wall 8A which is provided with a plurality of openings in which are secured, preferably by welding, sleeves 62 having peripheral flanges 64 at their upper ends. Each sleeve provides an entranceway for and supports a filter assembly consisting of a manifold 66 carrying a tube sheet 68 from which depend a plurality of filter elements 70. The latter may take any one of the several forms specified above with respect to filter elements 44. Although not shown, it is to be understood that suitable fastening means, such as bolts and nuts and gaskets, are employed to secure and seal tube sheets 68 to flanges 64. Each manifold has a suitable port as at 74 which is adapted to be connected to a line 76 which leads to effluent collection apparatus (not shown) via a control valve 78 and also is connected to a branch line 80 fitted with a control valve 82 and leads to a source of blowback gas. Valves 78 and 82 are operated in the same manner as valves 48 and 52 shown in FIG. 1 to permit the several filter bundles to be cleaned sequentially by blowback in the manner previously described in connection with the preferred embodiment shown in FIG. 1. The embodiment of FIG. 2 offers the advantage that the several filter bundles are accessible from outside the reactor, i.e., they may be pulled out directly without need for a worker entering the reactor via a manway. Hence this arrangement facilitates removal of filter units for repair or replacement.

As exemplified by the embodiments herein described and illustrated, the present invention provides substantially complete separation and recovery of catalyst dust from the reactor effluent stream, and does not require relatively large volumes of blowback gas for cleaning the filter elements and returning the catalyst to the reactor. Additionally overall space requirements are minimal as compared to prior systems since the filtering system and separation chamber form part of the reactor vessel. A further advantage is that the blowback gas applied to one filter unit does not impede or interfere with flow of effluent to the other filter units and instead assists in directing separated catalyst to the return pipe 26. The requirements of this invention also are such that reactors embodying the same may be designed for a wide variety of fluid bed catalytic reactions as noted above. In this connection it is to be noted that, according to the requirements of the particular reaction process, cooling or heating coils may be located within the fluid bed to maintain selected temperature conditions.

Obviously many other changes and modifications may be made in the illustrated apparatus without departing from the principles of the invention. Thus, for example, it is contemplated that where the nature of the process permits, the individual filter units may be replaced by conventional cyclone separators mounted within the separation chamber and having discharge ports connected to or provided with effluent discharge lines corresponding to exhaust pipes 36 in FIG. 1. Such cyclone separators may be mounted wholly within the separation chamber or may be secured to the upper end wall of the reactor vessel so that the inlet for dust-laden effluent and the outlet for separated dust are within the separation chamber and the outlet for dust-free effluent is outside of the vessel 2. Accordingly, as used herein, the term "gas-solids separating means" is to be construed as embracing both filter elements and cyclones.

Further with respect to modification of the invention, since the temperatures and pressures within the fluid bed reaction zone may be different (e.g., higher) than within the separation chamber, the lower part of the vessel comprising the fluid bed reaction zone and the disengaging zone may be made of a different material than the upper part thereof and in fact the apparatus may comprise two vertically spaced vessels connected by the catalyst return pipe 26 and the pipes 56, with the upper vessel comprising the separation zone and the lower vessel comprising the fluid bed reaction zone and the catalyst-disengaging zone. It also is appreciated that for some processes the pipes 56 may provide adequate heat dissipation without fins 58, while in other cases it may be necessary or preferred to replace fins 58 with a cooling jacket as shown at 86 in FIG. 2 through which a cooling fluid may be circulated via ports 88 and 90.

Accordingly, since changes such as described above may be made in the illustrated apparatus without departing from the scope of the invention herein disclosed, it is intended that all matter contained in the above description or shown in the accompanying drawings shall be interpreted in an illustrative rather than a limiting sense.

What is claimed is:

1. Apparatus for effecting contact between fluid reactants and finely divided catalyst particles comprising a vessel having an internal wall that subdivides said vessel into first and second chambers with said second chamber disposed above said first chamber, said internal wall having the general shape of an inverted cone, said first chamber having a bed of catalyst particles and a catalyst-disengaging zone above said bed, said vessel also having an inlet to said first chamber for fluid to fluidize said bed and a fluid outlet leading from said catalyst-disengaging zone, said vessel also having a fluid inlet for said second chamber, conduit means mounted on the exterior of said vessel connecting the fluid outlet of said first chamber with the fluid inlet of said second chamber for conducting a stream of catalyst-laden fluid to said second chamber from said catalyst-disengaging zone, said conduit means being adapted to cool the stream of catalyst-laden particles passing from said first chamber to said second chamber, gas-solids separating means in said second chamber for stripping catalyst dust from said catalyst-laden fluid, means connected to said gas-solids separating means for withdrawing catalyst-stripped fluid from said second chamber, and catalyst return means within said vessel for returning the catalyst dust stripped by said gas-solids separating means to said first chamber, said catalyst return means comprising a port in said wall at the apex of said cone and a pipe connected to said port for returning catalyst dust by gravity to the catalyst bed in said first chamber.

2. Apparatus for effecting contact between fluid reactants and finely divided solid catalyst particles comprising a vertically elongate vessel having a first chamber containing a bed of catalyst particles and having a catalyst-disengaging zone above said bed, said vessel also having an inlet to said first chamber for fluid to fluidize said bed and a second catalyst separation chamber above said first chamber, conduit means for conducting catalyst-laden fluid to said second chamber from said catalyst-disengaging zone and for cooling said catalyst-laden fluid as it passes from said first chamber to said second chamber, said conduit means comprising a plurality of pipes on the outside of said vessel with each pipe connected at one end to said second chamber and at the opposite end to the upper end of said first chamber in communicating relation with said catalyst-disengaging zone, said pipes being spaced circumferentially about said vessel, gas-solids separating means in said second chamber for stripping catalyst dust from said catalyst-laden fluid, means connected to said gas-solids separating means for withdrawing catalyst-stripped fluid from said second chamber, and means for returning the catalyst dust stripped by said gas-solids separating means to said first chamber.

3. Apparatus according to claim 2 including means for adjusting the rate at which catalyst dust stripped by said gas-solids separating means is returned to said first chamber.

4. Apparatus according to claim 2 wherein said means for returning catalyst dust stripped by said gas-solids separating means to said first chamber comprises a pipe within said vessel leading from said second chamber down into said first chamber.

5. Apparatus according to claim 1 wherein each of said plurality of pipes is provided with cooling means for cooling the catalyst-laden fluid as it passes from said catalyst-disengaging zone to said second chamber.

6. Apparatus according to claim 2 wherein said gas-solids separating means comprises a plurality of filtering means in said second chamber, each filtering means being provided with one of said means for withdrawing catalyst-stripped fluid from said second chamber.

7. Apparatus according to claim 6 wherein each of said means for withdrawing catalyst-stripped fluid from said second chamber comprises an exhaust pipe connected to one of said filtering means, and further including valve means for selectively preventing withdrawal of catalyst-stripped fluid via said exhaust pipes and for selectively feeding blowback gas to said exhaust pipes to remove catalyst deposited on said filtering means.

8. Apparatus according to claim 2 wherein said vessel has an internal wall that subdivides said vessel into said first and second chambers, said wall having a port providing communication between said first and second chambers, and further wherein said means for returning catalyst dust stripped by said gas-solids separation means to said first chamber comprises a catalyst return pipe within said vessel having one end connected to said port and the other end disposed to discharge catalyst dust into said catalyst bed.

9. Apparatus according to claim 8 wherein said internal wall is shaped so as to have a low point and said port is located at said low point.

10. Apparatus according to claim 8 further including valve means connected to said catalyst return pipe for controlling the rate at which catalyst dust is returned to said catalyst bed via said catalyst return pipe.